United States Patent [19]

Hughes

[11] 3,870,906

[45] Mar. 11, 1975

[54] RAMP/HOLD CIRCUIT

[75] Inventor: Richard Smith Hughes, Ridgecrest, Calif.

[73] Assignee: The United States of America as represented by the Secretary of the Navy, Washington, D.C.

[22] Filed: June 21, 1973

[21] Appl. No.: 372,443

[52] U.S. Cl.............. 307/261, 307/228, 307/235 R, 307/297, 328/183, 328/184, 328/185

[51] Int. Cl....... H03k 4/50, H03k 5/18, H03k 17/14

[58] Field of Search ........... 307/228, 240, 241, 242, 307/246, 261, 297, 235 R; 328/127, 128, 151, 181, 182, 183, 184, 185

[56] References Cited

UNITED STATES PATENTS

| | | | |
|---|---|---|---|
| 3,031,583 | 4/1962 | Murphy | 307/228 X |
| 3,187,263 | 6/1965 | Rosenstein | 328/185 |
| 3,210,558 | 10/1965 | Owen | 307/228 |
| 3,219,940 | 11/1965 | Cooke-Yarborough | 328/127 X |
| 3,528,036 | 9/1970 | Belleson | 307/246 X |
| 3,541,349 | 11/1970 | Bright et al. | 307/228 X |
| 3,573,639 | 4/1971 | Metz et al. | 328/127 |
| 3,697,781 | 10/1972 | McLean | 307/246 X |

FOREIGN PATENTS OR APPLICATIONS

| | | | |
|---|---|---|---|
| 283,349 | 1/1966 | Australia | 328/127 |

OTHER PUBLICATIONS

Weber, "Retrace Circuit for Character Display," IBM Tech. Discl. Bull.; Vol. 5, No. 11, p. 56–57; 4/1963.

Millman & Halkias, Electronic Devices and Circuits, p. 359–362, McGraw-Hill, Inc., 1967.

Hart, "Voltage Reference Sources;" Electronic Components (publication), 6/1970, Vol. 11, No. 6, p. 665–666.

Frushour et al., "Temperature Stable High-Speed Ramp Generator," IBM Tech. Discl. Bull.; Vol. 12, No. 7, p. 1071; 12/1969.

*Primary Examiner*—Michael J. Lynch

*Assistant Examiner*—Larry N. Anagnos

*Attorney, Agent, or Firm*—R. S. Sciascia; Roy Miller; Robert W. Adams

[57] ABSTRACT

A ramp/hold circuit (pulse width to pulse amplitude converter) having a constant current source driving a differential amplifier, and a current steering means for diverting the current source output from one side to the other of the amplifier. The input pulse determines the charge on a storage capacitor, which capacitor provides the circuit output. A discharge path for the capacitor is not provided until a gate signal is applied to a gating circuit.

2 Claims, 2 Drawing Figures

RAMP/HOLD CIRCUIT

BACKGROUND OF THE INVENTION

In the field of pulse converters, many prior devices and approaches are available for converting a pulse amplitude into a pulse width. Some of these utilize a differential amplifier, a current source, and a gating circuit. All known prior approaches and devices, however, do not possess the linearity and temperature stability required by many state-of-the-art applications.

The present invention uses the basic building blocks utilized by the prior devices, improves on them, and employs a novel current steering approach to obtain the desired results. That is, the present invention utilizes a differential amplifier, storage capacitor, gated discharge path, and constant current source. The constant current source, however, is redesigned to provide improved results. And, the approach of the invention uses current steering to channel the current through one or the other of the transistors of the differential amplifier. Thereby, the output that is provided by the circuit is temperature stable and extremely linear. The result is an exceptionally stable and useful temperature independent pulse width to amplitude converter.

DESCRIPTION OF THE PREFERRED EMBODIMENT

Figure 1:
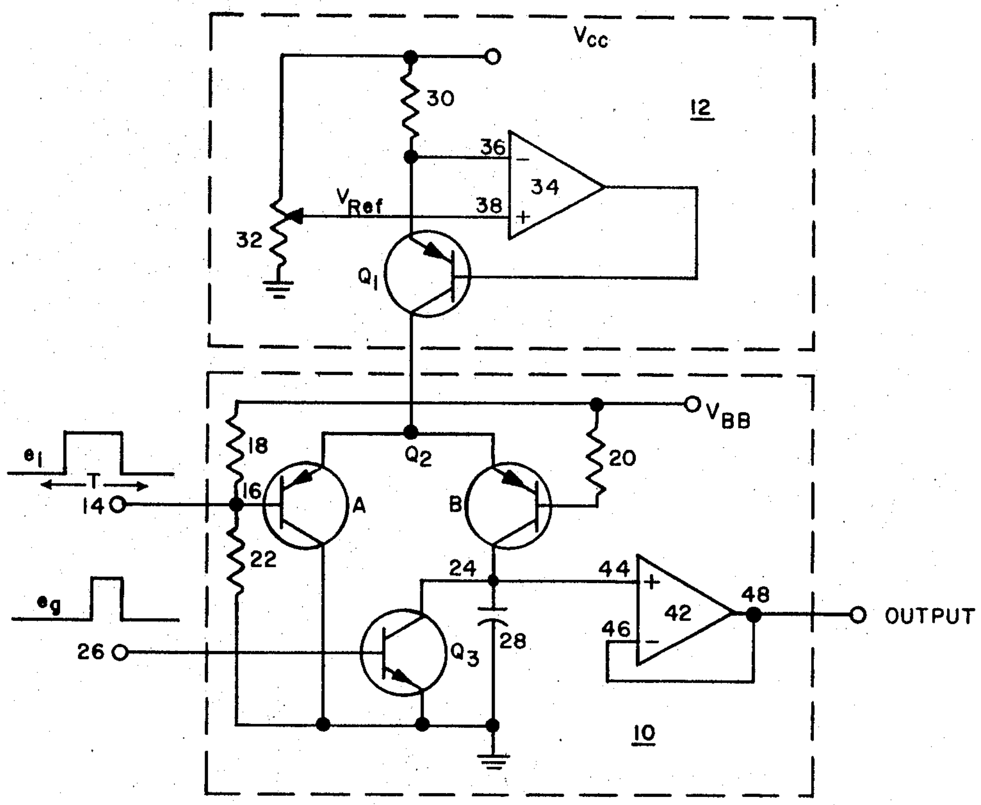
FIG. 1 is a schematic diagram of the preferred embodiment showing the present invention.

FIG. 1 shows the schematic diagram of the preferred embodiment of the present invention. The preferred embodiment consists of differential amplifier and current gate 10, and constant current generator 12. The purpose of constant current generator 12 is to provide a well regulated current to the differential amplifier of differential amplifier/current gate 10. And, the purpose of the gate circuit of differential amplifier/current gate 10 is to provide a remotely controlled discharge path for the charge storage capacitor of the circuit.

The differential amplifier composed of transistor pair $Q_2$, and associated electronics, provides one of two paths for the current from constant current generator 12. The first path, through transistor A, is a path to ground, and operates to shunt the current around the charge storage capacitor 28. The charge stored on capacitor 28 is responsible for the output of the circuit. As a result, if the current path is through transistor A the charge on capacitor 28 will remain unchanged.

If, however, the current path of the current from constant current generator 12 is through transistor B of transistor pair $Q_2$, the current will be coupled to charge storage capacitor 28. As a result, the charge stored on the capacitor will be changed by the current from the constant current source. The charge resulting from the path through transistor B is maintained on capacitor 28 by the high input impedance of operational amplifier 42 and the impedance of ungated transistor $Q_3$. The purpose of operational amplifier 42 is to act as a high impedance buffer between any external circuitry and capacitor 28.

In the constant current generator 12 the bias voltage source $V_{CC}$ is coupled through resistor 30 to the negative input 36 of operational amplifier 34, and to variable resistor 32. The selectable voltage output taken at variable resistor 32 is a reference voltage $V_{Ref}$ and is coupled to positive terminal 38 of operational amplifier 34. The ouptut of operational amplifier 34 is connected to the base of transistor $Q_1$. Operational amplifier 34 insures that the emitter voltage of transistor $Q_1$ is equal to the reference voltage $V_{Ref}$, and that it is independent of the temperature coefficient of transistor $Q_1$. As a result, the emitter current $I_E$ of transistor $Q_1$ equals $(V_{CC} - V_{Ref})/R_E$, where $R_E$ is resistor 30. That is, the current provided by constant current generator 12 is a constant dependent on the DC bias voltage source $V_{CC}$, the reference voltage $V_{Ref}$, and the emitter resistor 30, all of which are linear, and is controlled by the setting of variable resistor 32. The current provided by constant current generator 12 is coupled to transistor pair $Q_2$ of the differential amplifier of differential amplifier/current gate 10.

If a pulse is not applied to input 14, transistor A of transistor pair $Q_2$ is biased "on" as a conductive path to ground for the current provided by current generator 12. When transistor A is conductive, transistor B is turned "off." As a result, the current shunted through transistor A and around charge storage capacitor 28, and the charge value on the capacitor, remains unchanged.

If a pulse is applied to input 14, transistor A is turned "off" and transistor B is switched "on." The current path is then through transistor B to charge storage capacitor 28. The path through transistor B to capacitor 28 is maintained as long as the pulse is applied to input 14. And, the capacitor will charge in accordance with the classical equation $I = Cdv/dt$. The current I is the current $I_E$ provided by constant current generator 12. From the equation, since $I_E$ is constant, the voltage rate of change, $dv/dt$, is constant. Thus, because the capacitor only charges when an input pulse is applied to input 14, $dv = I_E dt/ C$, where dt is the width of the input pulse. As can be seen from the equation, the only variable to the right of the equal sign is dt (C is the value of capacitor 28 and $I_E$ is a constant provided by generator 12 once variable resistor 32 is set). As a result, capacitor 28 charges linearly, and does so only during T, which period is the pulse width.

At the end of pulse period T, or when the pulse input is otherwise removed, transistor A once again becomes conductive, transistor B is switched "off," and the current provided by current generator 12 is again shunted transistor A to ground. And, the charge on capacitor 28 remains unchanged. The voltage at junction 24 is the value of the charge and capacitor 28, and is coupled to positive terminal 44 of high impedance operational amplifier 42. The output of operational amplifier 42 is picked off at junction 48 and fed back to negative terminal 46, and is the system output which may be coupled to external equipment. The output is responsive to the charge on capacitor 28 and is provided as long as a charge is present.

Transistor $Q_3$ is connected between junction 24 and ground, and is normally non-conductive. The gating transistor, $Q_3$, is controlled by the signal applied to gate input 26, which input is connected to the base of transistor $Q_3$. When no pulse is applied to input 26 transistor $Q_3$ is "off," with the result that capacitor 28 is not provided with a discharge path. When an external gate pulse, $e_g$, is applied to input 26, transistor $Q_3$ is switched "on," providing a discharge path for capacitor 28. As a result, the charge on capacitor 28, and thereby the circuit's output, is maintained for a period of time determined by the externally controlled gate signal $e_g$.

Figure 2:
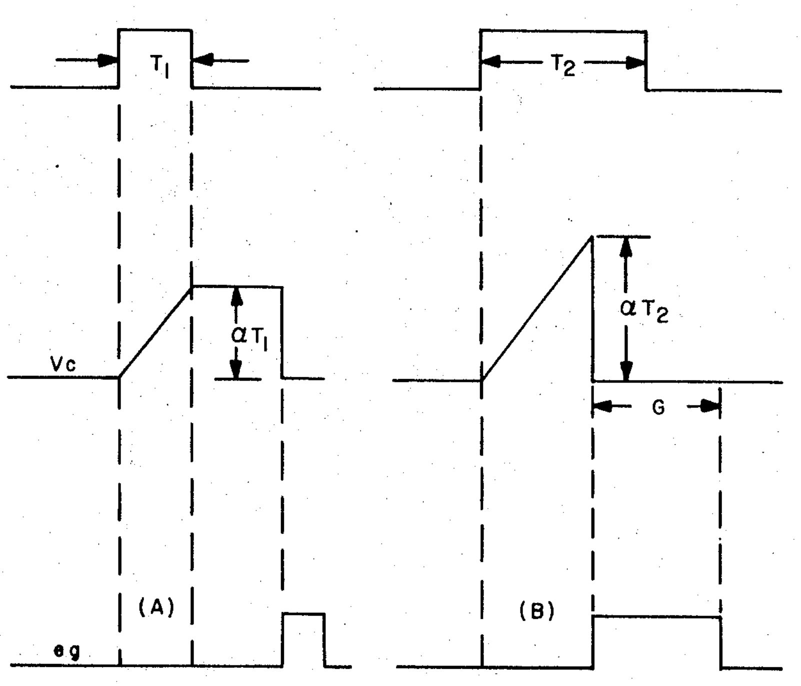
FIG. 2 is a waveform diagram showing the input pulse, the charge on the storage capacitor, and the gating signal in two examples.

FIG. 2 shows the waveforms of two examples of the operation of the preferred embodiment of FIG. 1. In FIG. 2 (A) the input pulse $e_i$ has a pulse width $T_1$. During the period of that pulse width transistor B is conductive and capacitor 28 is charged. The charge $V_C$ on capacitor 28 is a linear ramp function, as shown. The charge attained by the capacitor is maintained after period $T_1$ at a value proportional to the period of charge. In FIG. 2 (A) gating signal $e_g$ is applied after period $T_1$ has expired, and when applied provides a discharge path for capacitor 28. As a result, the charge $V_C$ is reduced to zero upon the application of the gating pulse $e_g$.

The second example shown in FIG. 2 (B) has the gating pulse $e_g$ beginning during the period of the input pulse $e_i$. The charge $V_C$ on capacitor 28 follows a ramp function, as before, until the gate pulse $e_g$ is applied. Then the charge is reduced to zero because the discharge path is provided through transistor $Q_3$.

The advantages of the present invention are its temperature stability and excellent linearity, and its external gating capabilities. The result of the embodiments of the present invention is an exceptionally stable, temperature independent pulse width to amplitude converter.

What is claimed is:

1. An electronic circuit for converting a signal pulse width into a voltage amplitude, comprising:

a differential amplifier including first and second transistors having commonly connected emitters, wherein each transistor provides a current path through said amplifier;

an input coupled to the base of said first transistor for receiving said pulse signal, wherein the current path through said amplifier is responsive to said signal;

a current source coupled to said commonly connected emitters providing a constant value of electrical current to said amplifier, including a third transistor, and an operational amplifier having its output directly connected to the base of said third transistor, wherein the collector of said third transistor is connected to said commonly connected emitters, its emitter and one input of said operational amplifier are coupled in common to a d.c. voltage source, and the operational amplifiers other input is coupled to a controllable reference voltage source;

charge storing means coupled to the collector of said second transistor for storing an electrical charge that is dimensionally associated with the signal pulse width received by said input; and discharging means coupled to said charge storing means for selectively providing a discharge path for said storing means;

wherein the current path of the current from said constant current source is through said second transistor to said charge storing means during the period said pulse signal is received by said input.

2. The circuit of claim 1 wherein said discharging means includes a transistor connected in parallel with said charge storing means, having an electrical signal input coupled to its base such that said transistor is controllably gated to provide said discharge path by applying an appropriate pulse to the input.

* * * * *